No. 892,558. PATENTED JULY 7, 1908.
F. W. SMITH.
UNIVERSAL COUPLING.
APPLICATION FILED MAY 31, 1907.

Witnesses
Wm. C. Dashiell.
J. J. Sheehy Jr.

Inventor
F. W. Smith.
By James J. Sheehy
Attorney

UNITED STATES PATENT OFFICE.

FREDERICK W. SMITH, OF ELLSWORTH, MICHIGAN.

UNIVERSAL COUPLING.

No. 892,558.           Specification of Letters Patent.           Patented July 7, 1908.

Application filed May 31, 1907. Serial No. 376,597.

*To all whom it may concern:*

Be it known that I, FREDERICK W. SMITH, citizen of the United States, residing at Ellsworth, in the county of Antrim and State of Michigan, have invented new and useful Improvements in Universal Couplings, of which the following is a specification:

My invention pertains to universal couplings; and it contemplates the provision of a simple, efficient and durable coupling designed more particularly for use in the propeller shafts of boats.

Figure 1:
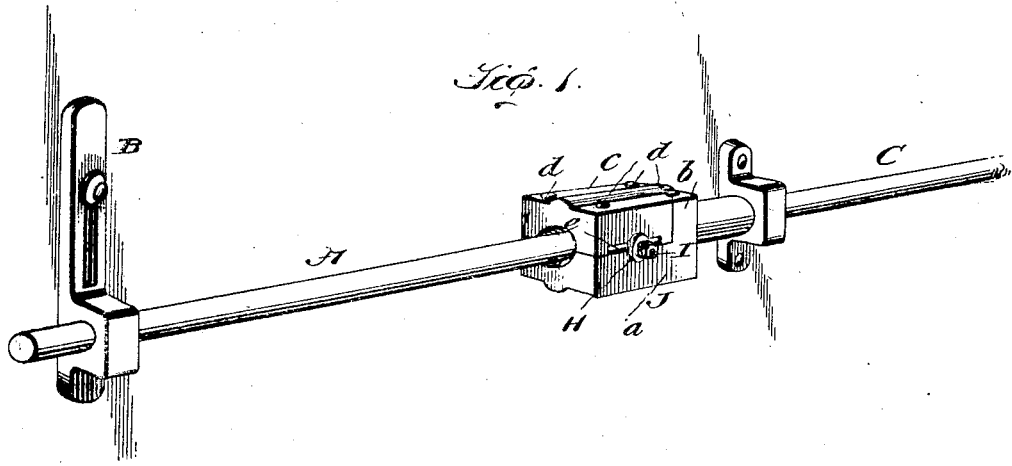
Figure 2:
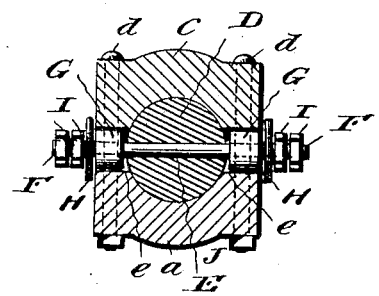
Figure 3:
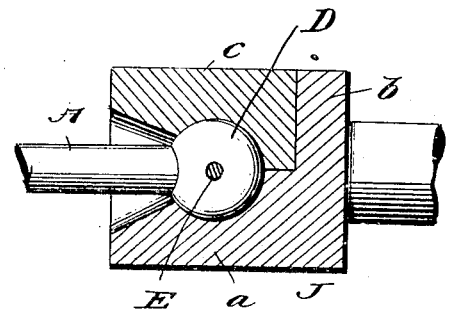

The invention will be fully understood from the following description and claim when taken in connection with the accompanying drawings, forming part of this specification, in which:

Figure 1 is a view illustrating a propeller shaft embodying my novel universal joint. Fig. 2 is an enlarged transverse section of the coupling taken through the trunnions and the anti-friction rollers of the ball comprised in the coupling, and: Fig. 3 is an enlarged, longitudinal-central section of the coupling.

Similar letters designate corresponding parts in all of the views of the drawings, referring to which:

A is the rear section of the propeller shaft of a boat. B is a vertically adjustable bearing through which the said section extends;. and C is the forward section of the shaft. The section A terminates at its forward end in a ball D, and in this ball is diametrically arranged a pin E which extends from opposite sides of the ball to form trunnions F and is provided on said trunnions with anti-friction rollers G, retained in position by washers H and nuts I. The section C terminates at its rear end in a socket J of a size and shape to receive and hold the ball D, as shown. This socket J comprises a body portion *a* formed integral with or fixed to the shaft section C and having a shoulder *b* at its forward end, a cap *c* arranged on said body portion and abutting at its forward end against the shoulder *b* thereof, and bolts *d* extending through and connecting the cap and the body portion. In the meeting edges of the body portion *a* and cap *c* are formed slots *e* in which the trunnions and anti-friction rollers of the ball are arranged and adapted to move. The openings formed by the slots *e* are, of course, of greater width than the diameter of the rollers G.

It will be apparent from the foregoing that my novel universal joint effects a strong and durable connection between the shaft section C and the shaft section A, and serves to transmit rotary motion from said section C to the section A while permitting of free up and down adjustment of the latter. It will also be apparent that the adjustment of the section A and the transmission of motion to said section A are attended with but a minimum amount of friction, this latter because of the interposition of the roller-bearing trunnions between the body portion and the cap of the socket J.

While my novel coupling is designed more particularly for use in the propeller shafts of boats, it may obviously be used to advantage in shafts of other descriptions without involving a departure from the scope of my invention.

Having described my invention, what I claim and desire to secure by Letters-Patent, is:

The combination with a universal joint, of a shaft section terminating in a ball and having trunnions extending in opposite directions from said ball, washers on the trunnions anti-friction rollers mounted on the trunnions at the inner sides of the washers, and nuts on the trunnions for holding the washers and rollers in place and a shaft section terminating in a socket receiving and holding the ball; the said socket comprising a body portion having a shoulder and a cap bolted to the body portion and abutting against the shoulder thereof, and having slots formed between the meeting edges of the body portion and cap and receiving the anti-friction rollers on the trunnions of the ball.

In testimony whereof I have hereunto set my hand in presence of two subscribing witnesses.

FREDERICK W. SMITH.

Witnesses:
    W. A. BOSS,
    E. R. HARRIS.